United States Patent
Salo

(10) Patent No.: US 8,534,970 B2
(45) Date of Patent: Sep. 17, 2013

(54) SHIPPING CHOCKS AND METHODS FOR LOADING CYLINDRICAL-SHAPED OBJECTS FOR TRANSPORT

(75) Inventor: Robert William Salo, Missoula, MT (US)

(73) Assignee: RockTenn CP, LLC, Norcross, GA (US)

( * ) Notice: Subject to any disclaimer, the term of this patent is extended or adjusted under 35 U.S.C. 154(b) by 697 days.

(21) Appl. No.: 12/211,191

(22) Filed: Sep. 16, 2008

(65) Prior Publication Data

US 2009/0238656 A1  Sep. 24, 2009

Related U.S. Application Data

(60) Provisional application No. 61/037,856, filed on Mar. 19, 2008.

(51) Int. Cl.
*B60P 7/08* (2006.01)

(52) U.S. Cl.
USPC ............. 410/49; 410/30; 410/32; 410/40; 410/42; 410/47; 410/155

(58) Field of Classification Search
USPC ............. 410/30–32, 36, 39, 40–42, 47, 49, 410/50, 94, 99, 121, 155; 211/59.4, 85.18; 188/32; 206/391, 446; 105/355; 414/802, 414/809

See application file for complete search history.

(56) References Cited

U.S. PATENT DOCUMENTS

| | | | |
|---|---|---|---|
| 2,746,571 A | 5/1956 | Taylor | |
| 2,956,646 A | 10/1960 | Isgren et al. | |
| D253,408 S | 11/1979 | Sargent | |
| D314,938 S * | 2/1991 | Anderson | ............. D12/217 |
| D343,821 S | 2/1994 | Bush et al. | |
| 5,476,348 A * | 12/1995 | Shelleby | ............. 410/49 |
| 5,647,708 A | 7/1997 | Letts, III | |

\* cited by examiner

*Primary Examiner* — Stephen Gordon
(74) *Attorney, Agent, or Firm* — Armstrong Teasdale LLP

(57) ABSTRACT

Shipping chocks for securing a transverse cylindrical-shaped object on top of at least two vertically oriented cylindrical-shaped objects are disclosed. Methods of loading cylindrical-shaped objects in both vertical and horizontal orientations, using the chocks, allows for more cylindrical-shaped objects to be shipped in a shipping container in a safe and effective manner that reduces shipping costs.

18 Claims, 13 Drawing Sheets

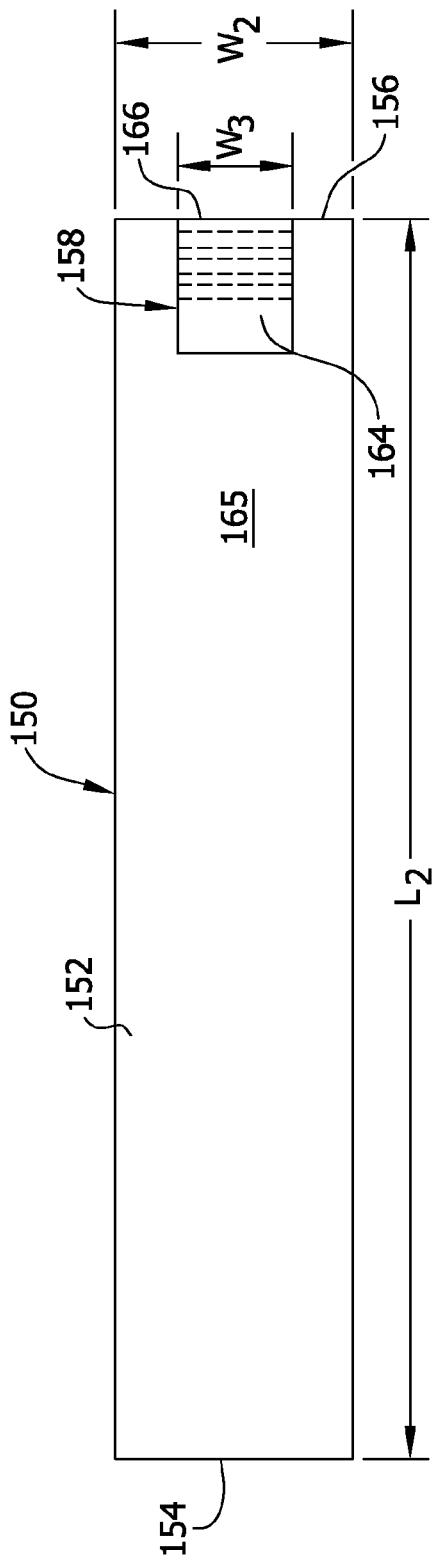
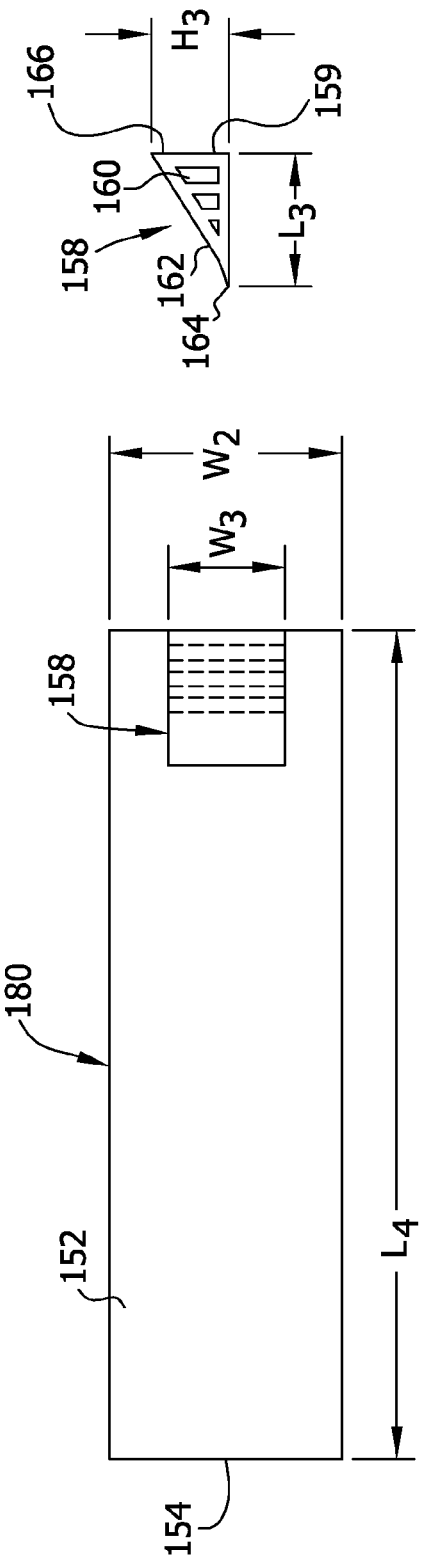

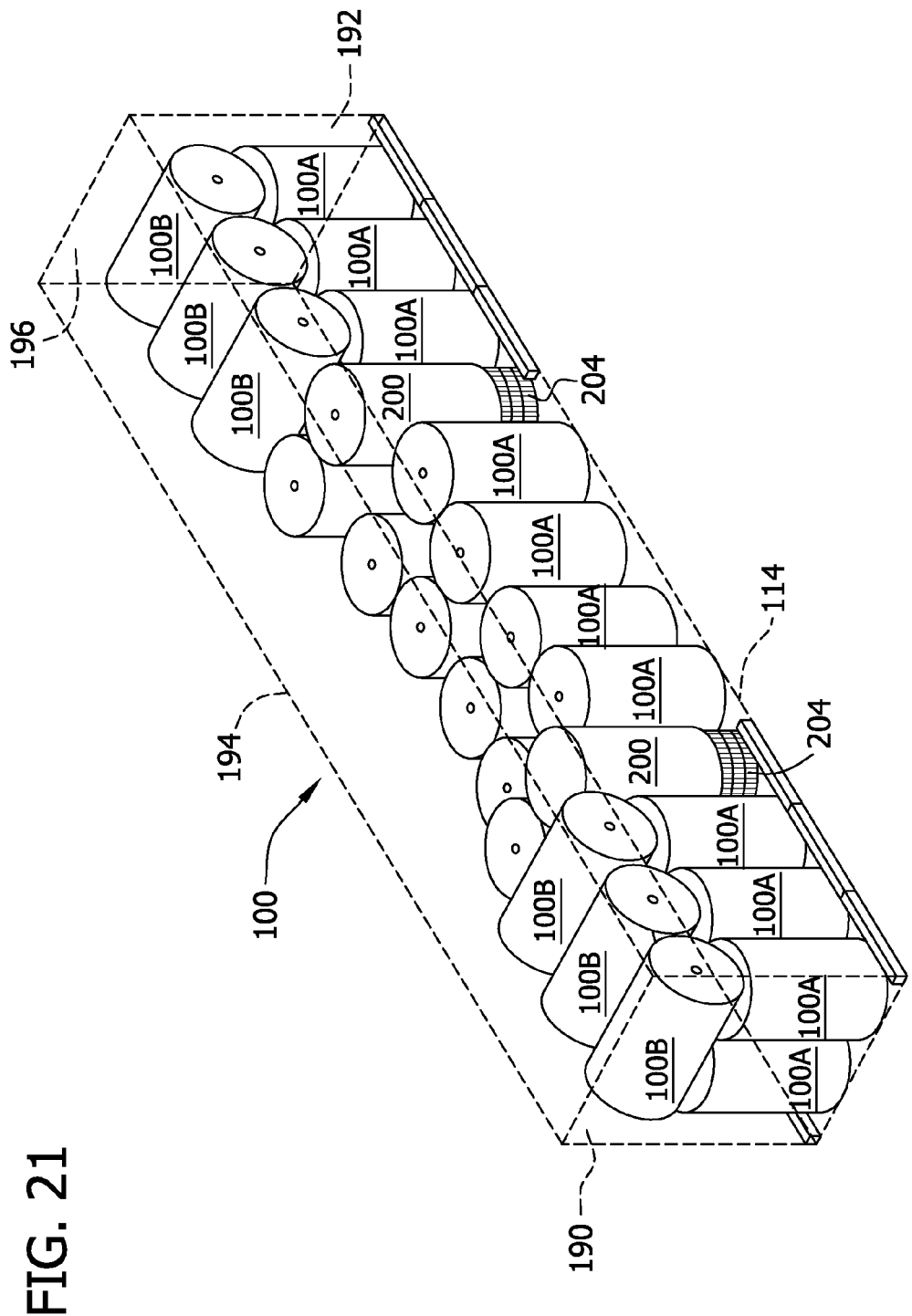

SHIPPING CHOCKS AND METHODS FOR LOADING CYLINDRICAL-SHAPED OBJECTS FOR TRANSPORT

CROSS REFERENCE TO RELATED APPLICATIONS

This patent application claims priority to U.S. Provisional Patent Application Ser. No. 61/037,856, filed on Mar. 19, 2008, which is hereby incorporated by reference in its entirety.

BACKGROUND OF THE INVENTION

This disclosure relates generally to devices and methods for loading and blocking articles in a container for transport, and more specifically to shipping chocks and methods for loading and securing large cylindrical objects in shipping containers.

A number of methods and techniques to effectively secure and transport a variety of different products in bulk are known in the shipping and freight industry. Such techniques are generally aimed to prevent movement or shifting of the loads in a shipping container such as, for example, a tractor trailer, a rail car, or other containers familiar to those in the art for packing and transporting goods in bulk from one location to another. Certain types of goods, however, present unique challenges to the shipping and freight industry.

As a general rule, it is advisable to stack goods in a shipping container where possible to maximize the efficient use of space in the container and to minimize shifting of the load. Not all goods however can be effectively stacked in a shipping container. As one example, paper is sometimes provided in large cylindrical rolls that are not conducive to conventional stacking techniques. Such rolls may be, for example, 50-58 inches in diameter and have a length of 74 inches or more. The large dimensions of such rolls have conventionally prohibited stacking of the rolls in a shipping container.

BRIEF DESCRIPTION OF THE INVENTION

Advantageous embodiments of shipping chocks and methods for loading and transporting cylindrical objects, such as large paper rolls, in a shipping container are disclosed. The chocks and methods facilitate stacked arrangements of paper rolls in a secure, efficient and low cost manner. Using the chocks and methods, a greater number of cylinders may be loaded into a shipping container such as a rail car, lowering shipping costs and leading to substantial savings.

More specifically, a shipping chock is disclosed for securing a first cylinder in a stacked, transverse position to a second cylinder and a third cylinder. The first cylinder may be horizontally oriented in an upper position, and the second and third cylinders may be generally vertically oriented in a lower position, with the first cylinder placed on top of the second and third cylinders. A series of cylinders may be placed in such an arrangement in a shipping container, with the shipping chocks preventing the transverse positioned cylinder from rolling off of the lower vertical cylinders, or otherwise falling and preventing safety hazards to personnel charged with loading and unloading the cylinders.

In an exemplary embodiment, a shipping chock may be provided for securing a first cylinder in a transverse position to a second cylinder and a third cylinder, with the second and third cylinders being vertically oriented. The shipping chock comprises a generally elongated runner having a length and a width, and a wedge extending upwardly from the runner. The wedge has a length and a width substantially less than the length and width of the runner. The wedge engages the cylindrical outer wall of the first cylinder and provides a stop surface that prevents the transverse cylinder from rolling on top of the vertically oriented cylinders by more than a predetermined amount during transit, and also prevents the transverse cylinder from rolling off the second and third cylinders while the transverse cylinders or other cylinders are being unloaded. The transverse cylinder remains in position on the vertically oriented cylinders unless it is lifted over the wedges.

Optionally, the wedge may be substantially centered across the width of the runner. The runner may comprise a first edge and a second edge with the length extending therebetween, and the wedge may be positioned proximate one of the first and second edges. The runner may be generally planar, and the wedge may be generally triangular in shape. The width of the runner may be, for example, about 8 inches, and the length of the runner may be about, for example, between 27 inches to about 42 inches. Chocks having different runner lengths may simultaneously be used to secure the first cylinder on top of the second and third cylinders that may be offset from one another. The wedge may be, for example, less than about three inches high, and may have a length of less than about 5 inches. The wedges may include openings or passages extending their entire width for weight savings and ventilation through the wedges. The wedges may secure, for example, transverse cylinders having a diameter between about 50 to about 58 inches in an exemplary embodiment.

Advantageous methods for loading cylinders for transport are also disclosed. The method includes providing the shipping chocks, and placing the chocks on the top ends of at least two vertically oriented cylinders. The at least two vertically oriented cylinders with the shipping chocks are then placed near one end of the container in what is sometimes referred to as a standard position with the shipping chocks on each cylinder generally aligned and parallel to one another. One of the vertically oriented cylinders may be spaced from the container at a different distance from the container end than the other vertically oriented cylinder, and in such a circumstance each of the vertically oriented cylinders may be used with a shipping chock having a different runner length, such that the wedges of each shipping chock are located an equal distance from the container end despite the cylinders themselves being located at different distances from the container end.

Once the vertically oriented cylinders are placed in the container, a cylinder may be placed transversely over the vertically oriented cylinders, sometimes referred to as a bilge position, by lifting the transverse cylinder over the wedges of the shipping chocks and slightly forward of the wedges, gently lowering the transverse cylinder and releasing the cylinders from about the height of the wedge, and allowing the transverse cylinder to roll and nest on the wedges of the chocks. In doing so, the transverse cylinder is captured between the wedges and the end wall of the container. As such, the wedges positively prevent the transverse cylinder from rolling away from the end wall of the container and falling off the vertically oriented cylinders.

A series of vertically oriented cylinders and transverse cylinders may be similarly placed in the container using the shipping chocks, with the next vertically oriented cylinders located adjacent the previously placed vertically oriented cylinders, and the shipping chocks of each successive transverse cylinder capturing the cylinder between the wedges of the shipping chocks and the preceding transverse cylinder.

Once a desired sequence of vertically oriented and transverse cylinders are placed as described, a cylinder riser may be placed at the end of the sequence. A blocking cylinder may be placed on the riser in an elevated position that abuts the last transverse cylinder and prevents the transverse cylinders from pivoting or turning. A bracing cylinder may also be placed adjacent the elevated blocking cylinder to prevent the elevated cylinder from moving. The blocking and bracing cylinders prevent the load of cylinders from moving during transport. A relatively compact, safe and secure arrangement of cylinders is therefore provided at one end of a shipping container.

If desired, the method steps may be repeated at the opposing end of the container to form two groups of cylinders having a mirror image arrangement with one group at each of the opposing ends of the container. A void filler such as an inflatable air bag may be placed and utilized to fill the space between the groups of cylinders at the ends of the container.

Using the shipping chocks to load cylinders transversely as well as vertically, as well as the blocking and bracing cylinders, more cylinders may be safely and securely shipped in a container, resulting in substantial cost savings to transport the cylinders in bulk.

BRIEF DESCRIPTION OF THE DRAWINGS

FIG. 5 is a top plan view of a first exemplary embodiment of a shipping chock for the arrangement shown in FIGS. 3 and 4.

FIG. 6 is a side elevational view of a portion of the chock shown in FIG. 5.

FIG. 7 is a top plan view of another exemplary embodiment of a shipping chock for the arrangement shown in FIGS. 3 and 4.

FIG. 21 illustrates still another cylinder arrangement in a shipping container.

DETAILED DESCRIPTION OF THE INVENTION

The inventive concepts will now be described in relation to the various detailed drawings, using exemplary dimensions and the like for illustrative purposes. It is understood, however, that the illustrative embodiments and dimensions are exemplary only, and that other embodiments having similar or different shapes, dimensions and attributes may likewise provide similar benefits. Accordingly, the exemplary embodiments, dimensions, etc. set forth below are not intended and shall not be considered limitations or restrictions on the practice of the inventive concepts described, except as explicitly defined by claims now or later presented directed to specific aspects of the inventive subject matter disclosed herein.

Figure 1:
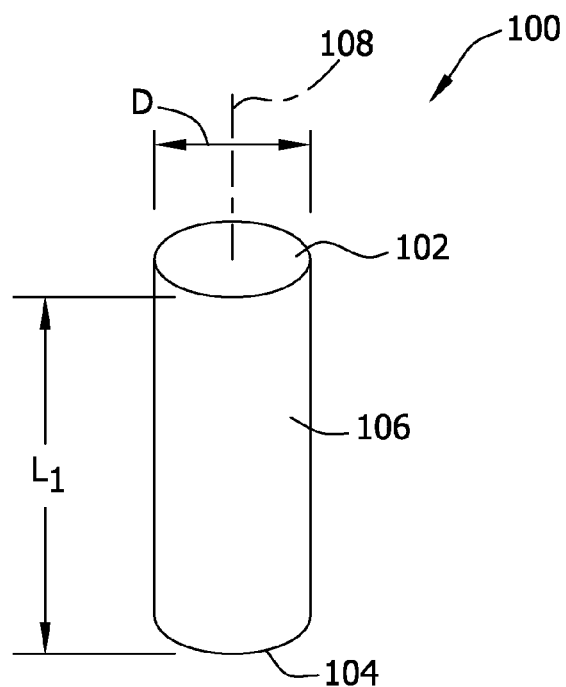
FIG. 1 is a front perspective view of a known cylinder that presents shipping challenges to those in the shipping and freight industry.

FIG. 1 is a front perspective view of a known cylindrical-shaped object 100, hereinafter referred to as a "cylinder" that presents shipping challenges to those in the shipping and freight industry. The cylinder 100 may be, among other things, an oversized roll of paper that is wrapped on or about a tubular core using known methods and techniques. While the inventive concepts described below are believed to be particularly beneficial for such paper rolls, it is appreciated that other cylindrical objects may likewise pose similar issues and may benefit from the devices and methods described below. Therefore, while the inventive concepts are discussed in the context of paper rolls, such discussion is provided for the purposes of illustration rather than limitation.

The cylinder 100 is defined by opposite ends 102, 104 and an outer cylindrical wall 106 extending between the opposing ends 102 and 104. The cylinder 100 is elongated or stretched along a longitudinal axis 108, and may have an axial length $L_1$ measured along the longitudinal axis 108 of, for example, about 83 inches. The cylinder 100 may further have an outer diameter D that may be, for example, about 50 to about 58 inches in an exemplary embodiment. The cylinder 100 may weigh over a thousand pounds and is typically moved with the assistance of a clamp truck familiar to those in the art.

Because of the size and weight of the cylinder 100, it presents specific challenges to freight workers. While some shipping containers such as tractor trailers, rail cars, or other containers can themselves be quite large, the size of the cylinder 100 generally renders the prospect of stacking them lengthwise with the longitudinal axis 108 oriented horizontally in a shipping container undesirable and impractical. Because of the large diameter of the cylinders 100, only a couple of them may lay horizontally in a side-by-side arrangement on the floor of a shipping container between the side walls of the container. Further, because of the relatively large length of the cylinders, the horizontally placed cylinders would occupy substantial floor space in the container. Typically, one more cylinder 100 could be horizontally stacked on top of such lengthwise cylinders in a shipping container. As such, only a small number of cylinders may be placed in a shipping container in such a horizontal stacking arrangement, and consequently this type of horizontal stacking is rarely used.

Figure 2:
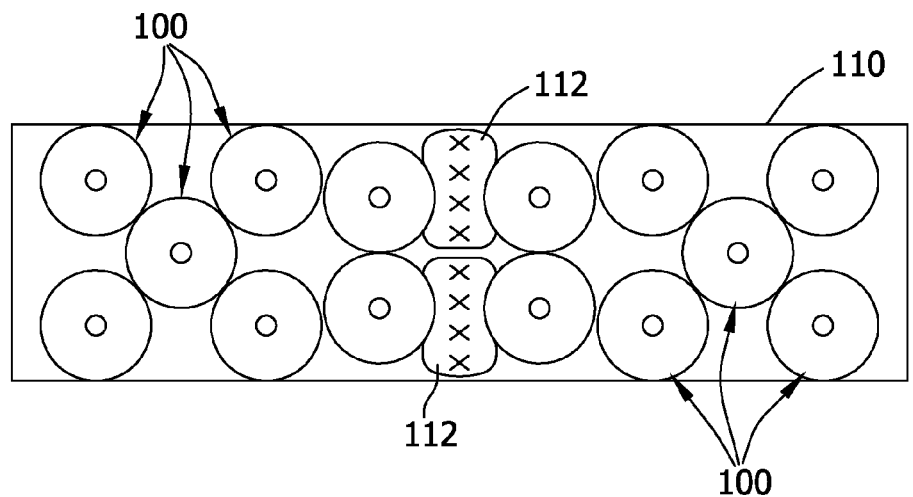
FIG. 2 schematically illustrates a known technique of shipping cylinders such as those shown in FIG. 1.

FIG. 2 schematically illustrates a known technique of shipping cylinders 100 vertically instead of horizontally in a shipping container such as a rail car 110. FIG. 2 illustrates a top view of the container 110, and it is seen that the cylinders 100 are arranged in two groups on each end of the container 110. Void fillers, such as inflatable air bags 112, are utilized that effectively unite the two groups so that they act as one during movement of the rail car 110. While the vertical loading arrangement depicted in FIG. 2 is effective to transport a greater number of cylinders 100 than would a horizontal stacking arrangement, it would nonetheless be desirable if more cylinders 100 could be transported in the rail car 110. While fourteen cylinders 100 (seven in each group on either side of the inflatable bags 112) are illustrated in FIG. 2, substantial cost savings could be obtained if the space in the container 110 was able to be used more effectively to transport a greater number of cylinders therein.

Figure 3:
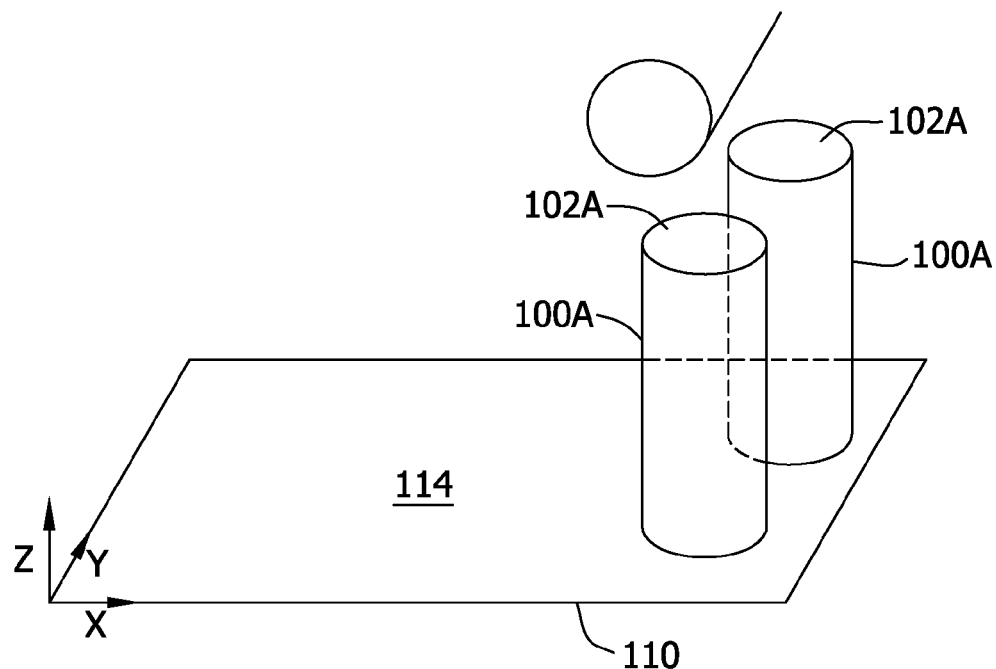
FIG. 3 illustrates a cylinder arrangement in accordance with an exemplary embodiment of the invention.

FIG. 3 illustrates a cylinder arrangement in accordance with an exemplary embodiment of the invention that would advantageously improve the space utilization of a shipping container for transporting cylinders 100. FIG. 3 illustrates a conceptual layout of cylinders 100 on a floor 114 of the shipping container 110, which may take the form of a rail car. For the sake of description the container 110 may, as shown in FIG. 3, be considered to have an x dimension corresponding to the length of the container, a y dimension corresponding to the width dimension of the container, and a z dimension corresponding to the height of the container. The x, y, and z dimensions are perpendicular to one another as in a conventional Cartesian coordinate system, with the x and y axes lying in a horizontal plane corresponding to the floor 114 of the container, the y and z axes lying in a vertical plane corresponding to the end walls of the container 110, and the x and z axes corresponding to the side walls of the container.

The floor space in the x, y plane of the floor 114 presents a practical limitation on the number of cylinders 100A that can be placed in a vertical orientation on the shipping container floor 114. One way to achieve a greater cylinder capacity in the container 110 would be to utilize existing space above the top ends 102A of adjacent, vertically oriented cylinders 100A with a transversely extending cylinder 100B. That is, as also shown in the end view of FIG. 4, the cylinder 100B may be rotated 90° from the cylinders 100A such that its longitudinal axis 108B is generally perpendicular to the longitudinal axes 108A of the cylinders 100A. Once so rotated, the side wall 106B of the transversely oriented cylinder 100B may rest upon the top ends 102A of the vertically oriented cylinders 100A.

Figure 4:
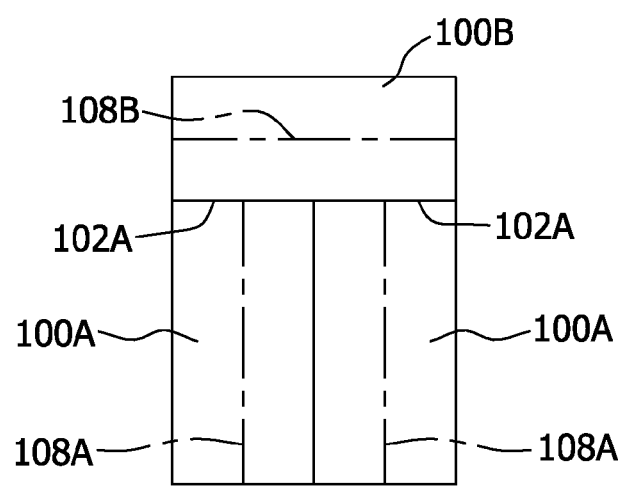
FIG. 4 is an end view of the arrangement shown in FIG. 3.

FIG. 5 is a top plan view of a first exemplary embodiment of a shipping chock 150 that secures the transverse cylinder 100B in relation to the vertically oriented cylinders 100A in the arrangement shown in FIGS. 3 and 4. The shipping chock 150 facilitates safe loading and unloading of the transverse cylinder 100B, and the advantageous methods of loading cylinders explained below.

In an exemplary embodiment, and as shown in FIG. 5 in top view and in FIG. 6 in a partial side view, the shipping chock 150 includes a generally elongated runner 152 having a length $L_2$ and a width $W_2$. In an exemplary embodiment the runner 152 is a generally flat and planar sheet of material provided as an elongated rectangular strip having a first end edge 154 and a second end edge 156 with the length $L_2$ extending between, although it is contemplated that other shapes of runners may alternatively be utilized. In one embodiment, the runner 152 is fabricated from rubber and has thickness dimension, measured perpendicular to the plane of the page of FIG. 5, of about 2 mm, although other thicknesses and other suitable materials could be used in alternative embodiments.

In the example shown in FIG. 5, the width $W_2$ of the runner 152 is, for example, about 8 inches and the length $L_2$ of the runner 152 is about, for example, 42 inches. While a 42 inch length $L_2$ has been found sufficient to accommodate cylinders having an outer diameter D (FIG. 1) of about 58 inches, it is contemplated that other lengths of runners may be selected for other cylinder sizes and diameters. For example, the runner 152 may in another embodiment be 37 inches to accommodate a cylinder having a 50 inch diameter. Various other combinations of runner lengths and cylinder diameters are possible.

As shown in FIGS. 5 and 6, the shipping chock 150 further includes a wedge 158 extending upwardly from the runner 152 proximate the end edge 156. In an exemplary embodiment, the wedge 158 may be substantially centered across the width $W_2$ of the runner 152, although in another embodiment the wedge may be off-centered on the width $W_2$, or in still another embodiment the wedge 158 may extend across the full width $W_2$ of the runner 152.

As best shown in FIG. 6, the wedge 158 may be generally triangular in cross-sectional shape, and may have a length $L_3$ of about 4 and ½ inches, a height $H_3$ of about 2 and 11/16 inches, and a width $W_3$ (FIG. 5) of approximately 4 inches. The length $L_3$ and width $W_3$ of the wedge 158 are much less than the length $L_2$ and width $W_2$ of the runner 152, while the height $H_3$ of the wedge 158 is much greater than the thickness of the runner 152. It is understood that various other dimensions of the components are possible that may deviate from these proportions. In the exemplary embodiment, a vertical face 159 extends upward from runner 152 and has height $H_3$. In one embodiment, a reflective material is applied, adhered, formed integrally with, and/or otherwise coupled to vertical face 159. The reflective material facilitates enabling an operator, for example, an operator of a machine used to move the cylinders 100, to verify that the shipping chock 150 is in place on the vertically oriented cylinders 100A before the transverse cylinder 100B is positioned thereon.

The wedge 158 may further include openings or passages 160 extending therethrough along the entire width $W_3$ of the wedge 158, for weight savings and ventilation. An inclined ramp surface 162 extends in an upward direction from the runner 152, and a has a proximal end 164 and a distal end 166. The proximal end 164 is at approximately the same elevation as an upper surface 165 of the runner 152 and the distal end 166 is at an elevation $H_3$ from the upper surface 166 of the runner 152. The proximal end 164 of the wedge 158 is spaced from the second end 156 of the runner 152 and the distal end 166 of the wedge 158 is generally aligned with the second end 156 of the runner 152. In another embodiment, the proximal and distal ends could be alternatively spaced and positioned on the runner 152.

In an exemplary embodiment, the wedge 158 is fabricated from the same material as the runner 152 (e.g., rubber) and separately attached to the runner 152 with an adhesive, although the wedge 158 could in another embodiment be integrally formed with the runner 152 in, for example, a molding operation of the like. In still another embodiment, the wedge 158 may be fabricated from a different material than the runner 152 but otherwise securely coupled to or otherwise attached to the runner 152.

While a triangular shaped wedge 158 has been described in detail, it is contemplated that the wedge may have other non-triangular shapes in another embodiment, but that serves a similar functional purpose, namely to provide a stop surface to prevent rotation or relative movement of the transverse cylinder beyond a predetermined degree, as will soon become apparent below. To that end, various shapes may be employed as those in the art will recognize.

FIG. 7 illustrates another exemplary embodiment of a shipping chock 180 that is similar to the chock 150 but includes a runner 152 having a different length $L_4$ than the length $L_3$ shown in FIG. 5. More specifically, the length $L_4$ is less than $L_3$ and in an exemplary embodiment $L_4$ is about 27 inches, although other dimensions are possible As explained below, shipping chocks 150 and 180 having different lengths can be used in tandem to facilitate placement of a transverse cylinder on vertically oriented cylinders that are offset from one another.

Figure 8:
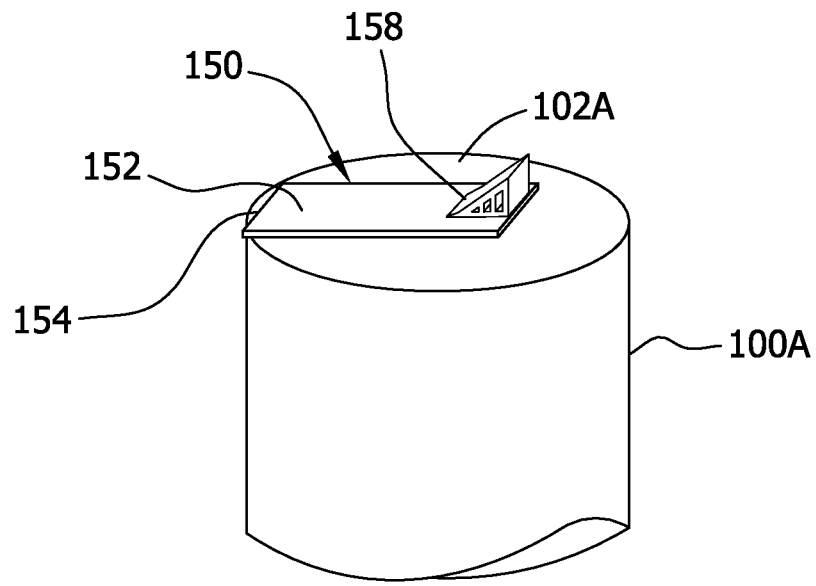
FIG. 8 is a partial perspective view of a first cylinder with a chock thereon.

FIG. 8 is a partial perspective view of a first cylinder 100A with a shipping chock 150 thereon. The runner 152 of the chock 150 is extended over the top end 102A of the cylinder 100A and is frictionally engaged to the top end 102A. The end edge 154 of the runner 152 is generally adjacent the outer edge of the top end 102A, with the wedge 158 being spaced from the end edge 154 on the top end 102A. The chock 150 may be placed manually in this arrangement by a worker and may be manually removed when no longer needed.

Figure 9:
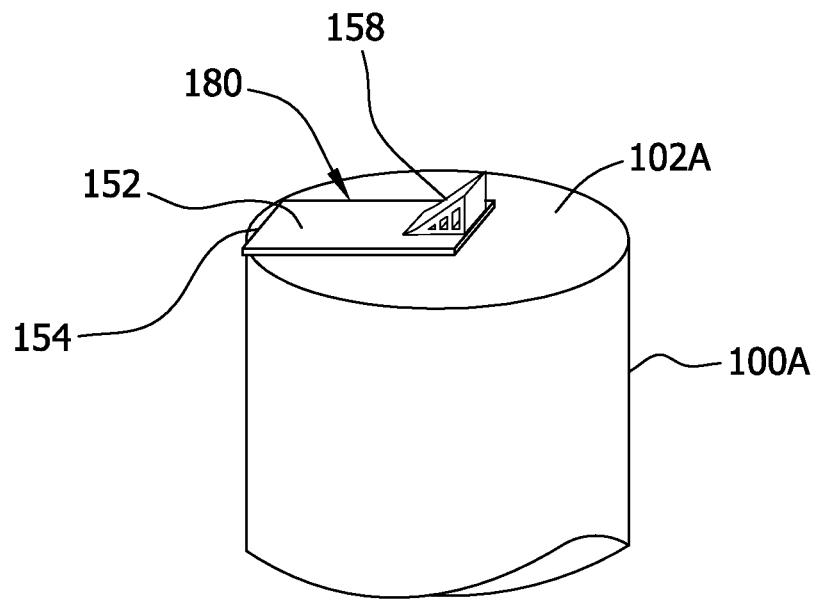
FIG. 9 is a partial perspective view of a second cylinder with a chock thereon.

FIG. 9 is a partial perspective view of a second cylinder 100A with the chock 180 on the top end 102A in a similar manner.

Figure 10:
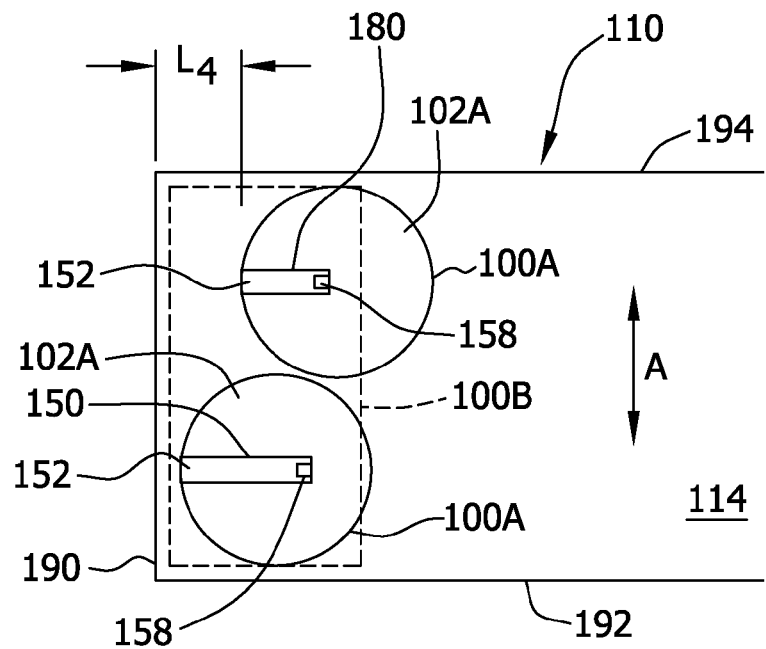
FIG. 10 illustrates the first and second cylinders shown in FIGS. 8 and 9 positioned in position for loading of transverse cylinder on the chocks.

FIG. 10 illustrates the first and second cylinders 100A positioned in the container 110 and vertically oriented on the container floor 114. The cylinders 100A are each positioned proximate an end wall 190 of the container 110 and adjacent the respective side walls 192, 194 of the container 110 near the end wall 190. That is, the cylinders 100A are placed near the corners of the end wall 190 and the side walls 192 and 194 of the container 110. However, as shown in FIG. 10, the cylinders 100A are not placed at equal spacing from the container end wall 190.

In the depicted embodiment, the cylinder 100A having the shorter chock 180 is spaced from the end wall 190 by a short distance $L_4$, which in an exemplary embodiment may be occupied by dunnage and the like. The distance $L_4$ in an exemplary embodiment may be 15 inches, although other spacing distances are possible.

The cylinder 100A having the chock 150, however, is positioned nearly immediately adjacent the end wall 190. The arrangement is sometimes referred to as an offset or staggered arrangement wherein the centerlines of the cylinders 100A are not aligned between the container side walls 192 and 194, although in another embodiment the cylinders 100A could be aligned between the side walls 192 and 194 if desired. That is, the staggered arrangement of the cylinders may be considered optional in some embodiments.

It should be understood that the different lengths of the chocks 150 and 180 is selected so that the wedges 158 are generally aligned with one another at about the same distance from the end wall 190, despite the cylinders 100A being staggered from the container end wall 190. That is, the difference in the lengths of the runner 152 of the chocks 150 and 180 is about equal to the distance $L_4$ so that when the runners 152 are arranged generally parallel to one another as shown in FIG. 10, the wedges 158 are positioned approximately parallel to one another and approximately equidistant from the end wall 190. Positioned as such, the wedges 158 of the chocks 150 and 180 are well positioned to accommodate and engage, for example, a 58 inch diameter transverse roll 100B (shown in phantom in FIG. 10) that is loaded on top of the cylinders 100A. As previously mentioned, other lengths of runners 152 could be selected to accommodate transverse cylinders 102B of other diameters, including but not limited to a 37 inch length runner for use with a 50 inch diameter transverse roll.

Additionally the transverse distance between the chocks 180 and 150, measured parallel to the container end wall 190, may be adjusted to accommodate various lengths of the transverse cylinder 100B. That is, the chocks may be moved closer together or farther apart, as indicated by the arrow A in FIG. 10 accommodate a shorter length or a longer length, respectively, of the transverse cylinder 100B. As one example, the runners may be moved closer or father apart from a center position on each cylinder 100A in the direction of arrow A by a distance equal to the width $W_3$ (FIGS. 5 and 7) of each of the runners 152 such that a worker need not have to use a measuring tool to place the chocks 150 and 180. In another embodiment, the worker may precisely measure a desired distance between the chocks 180 and 150 and place the chocks 180 and 150 accordingly on the cylinders 100A. Regardless of how it is determined, the distance between the chocks 180 and 150 should be selected to allow a clamp of a truck to engage the cylinder 100B without disturbing the wedges 158 of the chocks 180 and 150.

Figure 11:
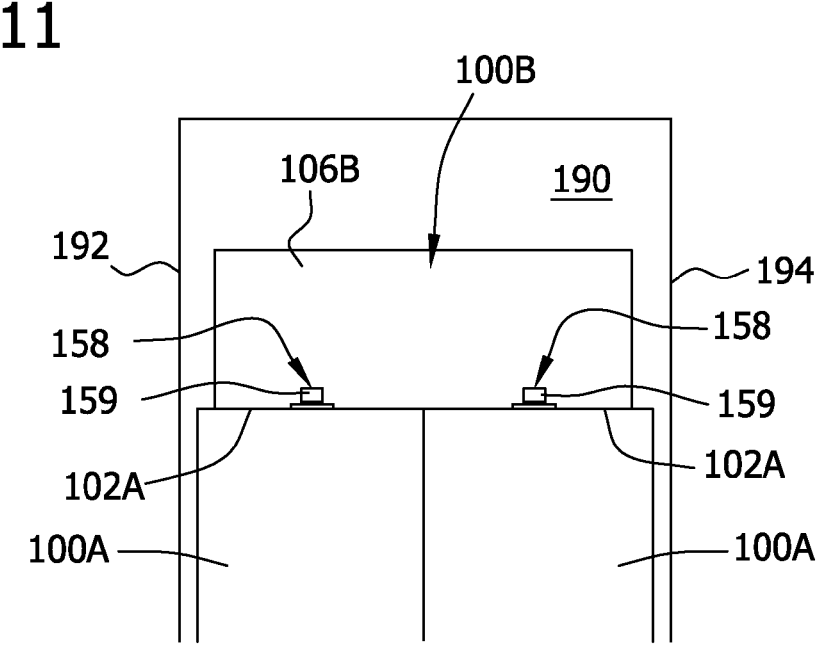
FIG. 11 is an elevational view showing the transverse cylinder loaded on the shipping chocks.
Figure 12:
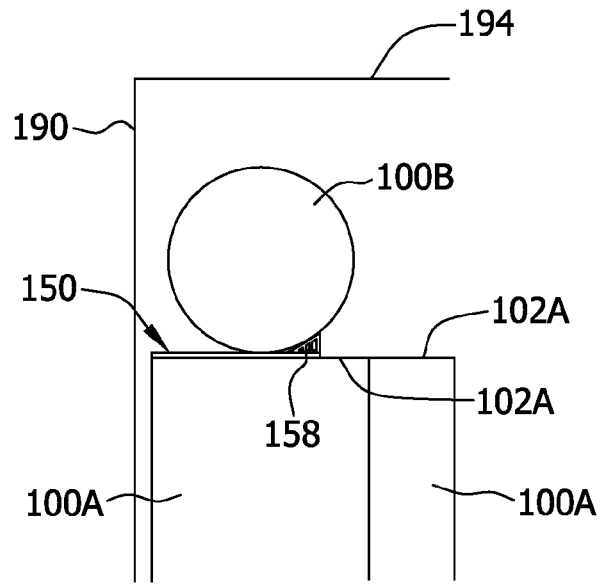
FIG. 12 is a side elevational view of the cylinders shown in FIG. 11.

FIGS. 11 and 12 illustrate the transverse cylinder 100B atop the cylinders 100A in an end view and side view The wedges 158 of the chocks 180 and 150 engage the cylindrical outer wall 106B of the transverse cylinder 100B atop the top ends 102A of the cylinders 100A. The wedges 158 provide a stop surface that effectively captures or traps the transverse cylinder 100B between the wedges 158 and the container wall 190 in transport, effectively limiting its freedom to roll off the second and third cylinders 100A during loading and unloading procedures. Also, the transverse cylinder 100B rests upon the runners 152 (FIG. 10) of the chocks and help prevent the transverse roll from sliding or pivoting on the ends of the vertically oriented cylinders 100A.

Figure 13:
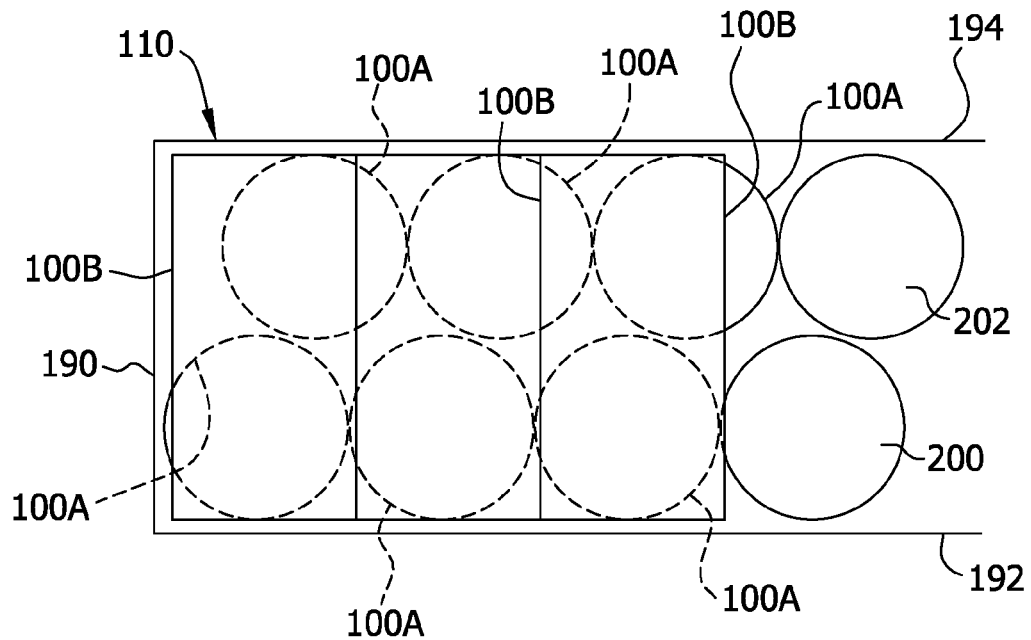
FIG. 13 illustrates a series of cylinder arrangements shown in FIGS. 10-12 in a shipping container, with blocking cylinders in place.
Figure 14:
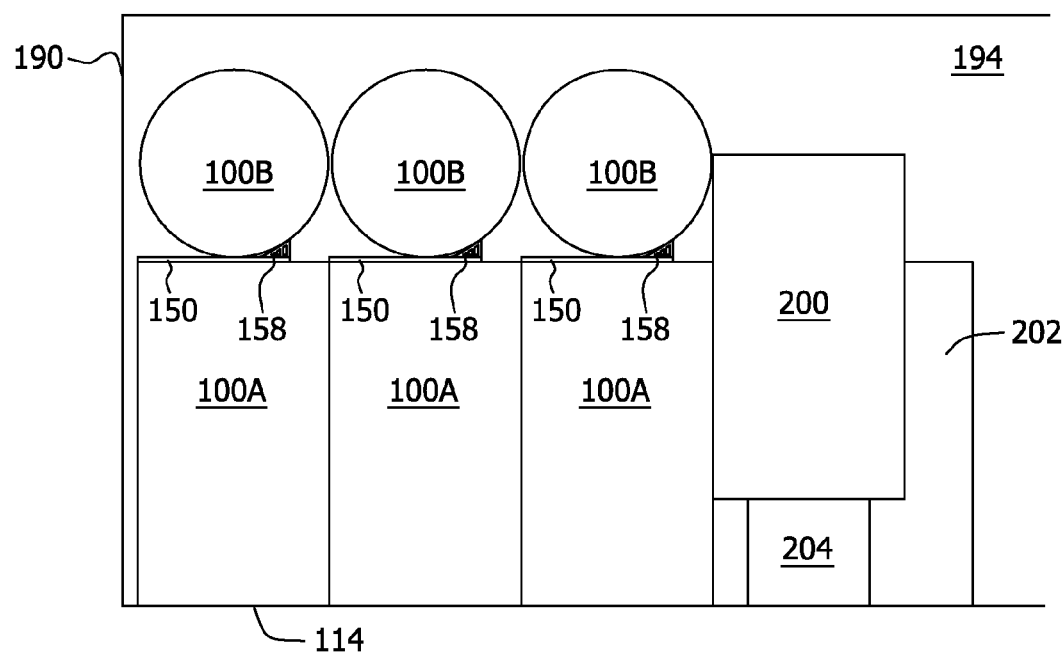
FIG. 14 is a side elevational view of the series of cylinder arrangements shown in FIG. 13.
Figure 15:
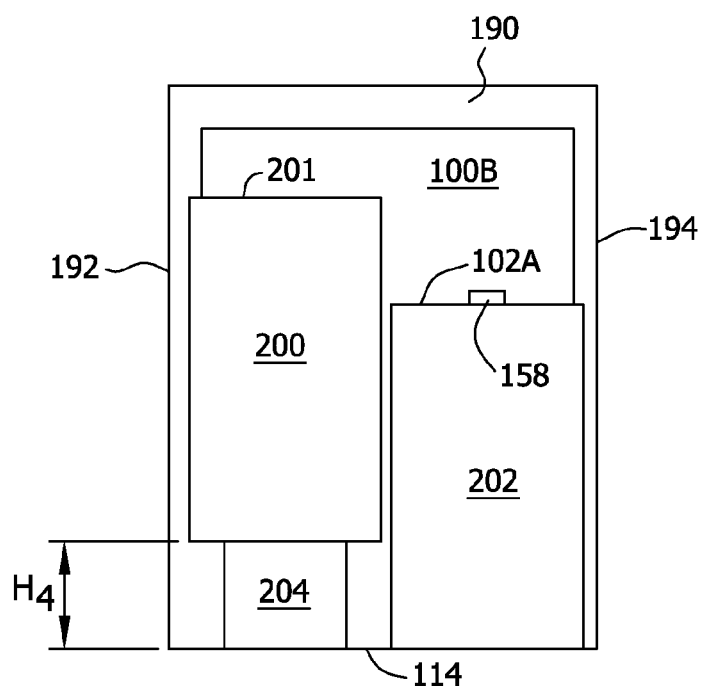
FIG. 15 is an end elevational view of the arrangement shown in FIGS. 13 and 14.

FIG. 13-15 illustrates various views of a series of vertical cylinders 100A and transverse cylinders 100B placed end-to-end in the container 110, with a blocking cylinder 200 and a bracing cylinder 202 positioned at the end of the sequence. While three sequences of cylinders arranged as shown in FIGS. 10-12 is shown in FIGS. 13-15, greater or fewer sequences of cylinder arrangements could likewise be utilized in other embodiments.

As seen in FIGS. 14 and 15, the blocking cylinder 200 is placed on a riser 204 that elevates the blocking cylinder 200 from the floor. In one embodiment, the blocking cylinder 200 may be generally similar to, if not identical to, the cylinders 100A and/or 100B. Alternatively, the blocking cylinder 200 may be a cylinder of the same material (e.g., a paper roll) having a similar outer dimension to the cylinders 100A or 100B, but a different length.

The riser 204 may be fabricated from any known material in any shape that may structurally support the weight of the blocking cylinder 200. In the embodiment depicted, the riser 204 is a tubular or cylindrical riser having a smaller outer diameter than the blocking cylinder 200, and as such the riser 204 is spaced from the container side wall 192 and the preceding vertical cylinder 100A so that the riser 204 is approximately centered beneath the blocking cylinder 202. In another embodiment, the riser 204 may simply be a smaller paper roll cylinder. A sheet of corrugated slip material may, for example, be placed on the riser 204, prior to placement of the blocking cylinder 200 to avoid potential markings that the riser 204 may otherwise make on the blocking cylinder 200.

The riser is selected to have a height $H_4$ sufficient to raise the top end 201 of the blocking cylinder 200 above the top ends 102A of the cylinders 100A and prevent the transverse cylinders 100B from pivoting on the top ends 102A of the cylinders 100A. The height $H_4$ may be increased or decreased depending on the length of the blocking cylinder 200.

The bracing cylinder 202 is seated on the container floor 114 adjacent the blocking cylinder 200 and prevents movement of the cylinder 200 during transit. The blocking and bracing cylinders 200 and 202 therefore provide redundant blocking features that keep the vertical and transverse cylinders 100A and 100B in place during transit.

Figure 16:
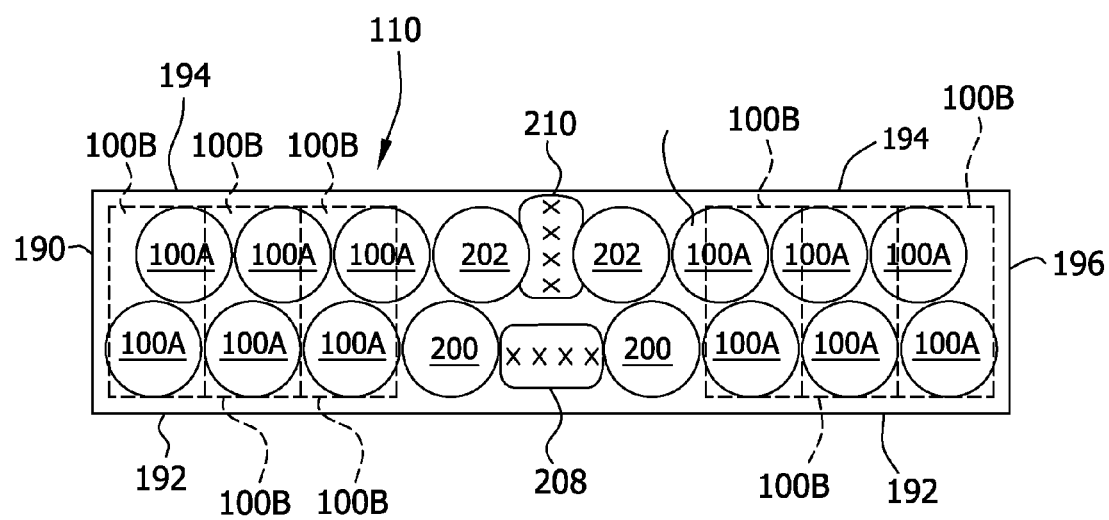
FIG. 16 illustrates a shipping container with the cylinder arrangement shown in FIGS. 14 and 15 on both ends of the container.

FIG. 16 illustrates the shipping container 110 with a first group of cylinders 100A, 100B, 200 and 202 extending from the container end 190, and a second group of cylinders 100A, 100B, 200 and 202 extending from the container end 196. The groups of cylinders are essentially mirror images of one another for load equalization purposes, and inflatable air bags 208 and 210 are placed between the groups and unify the groups for transit in the container 110. Void fillers such as airbags may also be utilized between one or more adjacent cylinders in each group if desired.

It should be noted that the embodiment of FIG. 16 provides for twenty-two cylinders to be loaded into the container 110, namely twelve vertical cylinders 100A, six transverse cylinders 100B, two blocking cylinders 200 and two blocking cylinders 202. This is a significant improvement over conventional loading methods such as that shown in FIG. 2 wherein cylinders are loaded only vertically in the container. While the actual number of cylinders that can be loaded in the container 110 varies with the size of the cylinders, the vertical and horizontal loading techniques using the chocks described above has been found to allow loading of twenty-six to twenty-eight paper roll cylinders in, for example, a single 50 foot rail car.

Of course, a larger container, such as a 60 foot rail car, could accommodate even more cylinders. In one embodiment, thirty-two cylinders may be loaded in a 60 foot rail car, including twenty four cylinders loaded in a vertical orientation on the container floor and eight transversely cylinders.

FIGS. 18-21 illustrate other potential cylinder arrangements in perspective view. In the embodiment shown in FIG. 18, the space between the two cylinder groups is filled with additional cylinders 100A in lieu of the inflatable bags 210 and 212 shown in FIG. 16, allowing still more cylinders to be placed in the container 110. Void fillers such as air bags may be placed between individual cylinders in the arrangement as desired.

Figure 18:
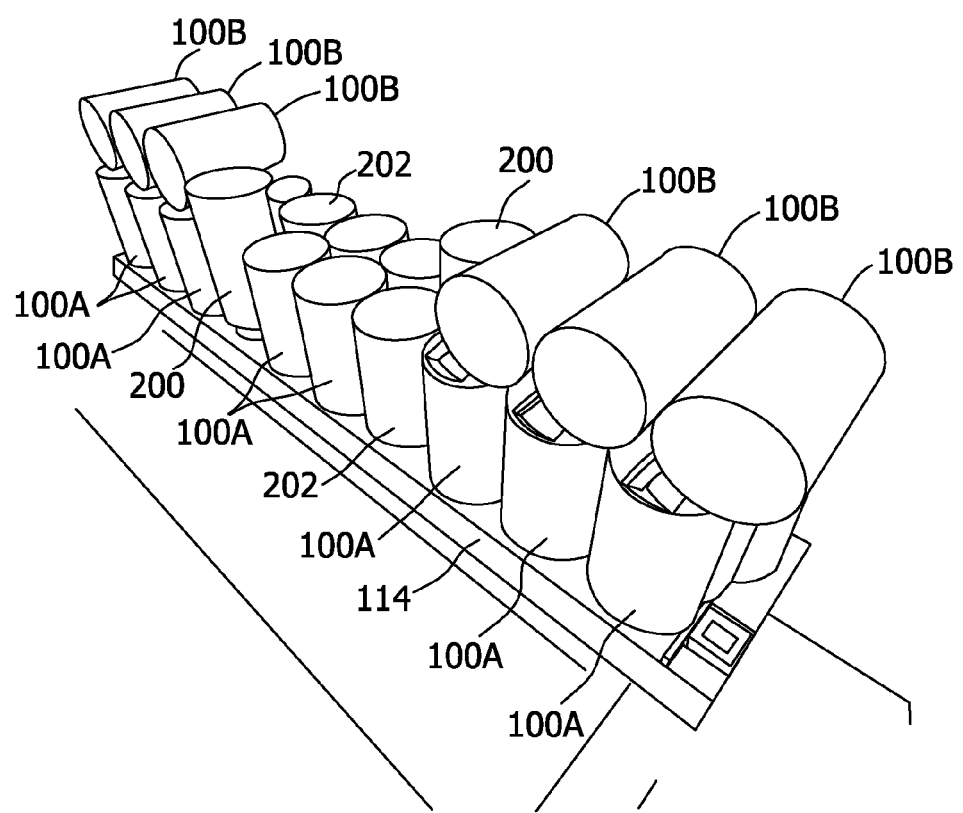
FIG. 18 is a perspective view of an alternative embodiment of cylinder arrangements at both ends of the container.
Figure 19:
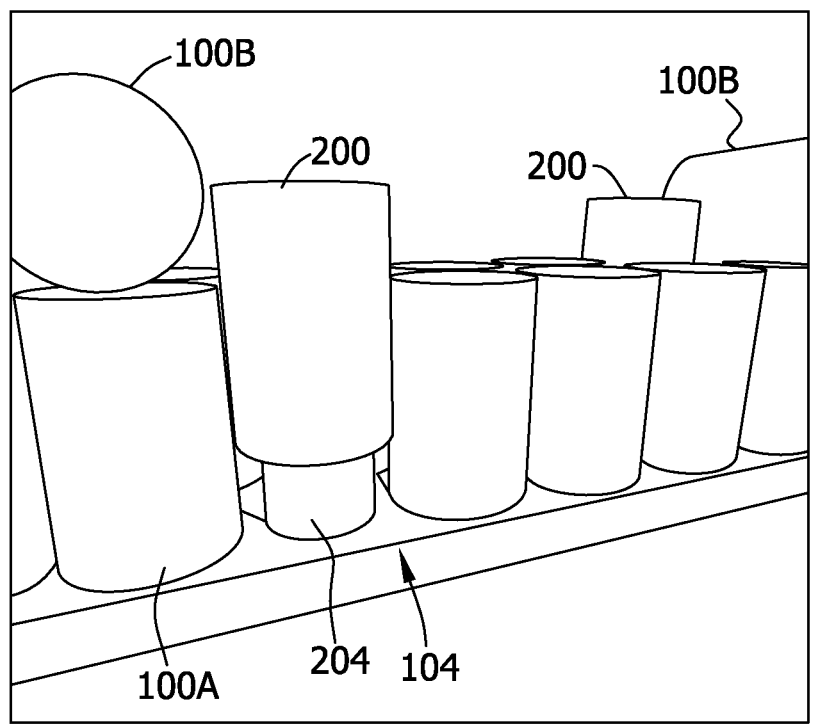
FIG. 19 is a side perspective view of the cylinder arrangement shown in FIG. 18.
Figure 20:
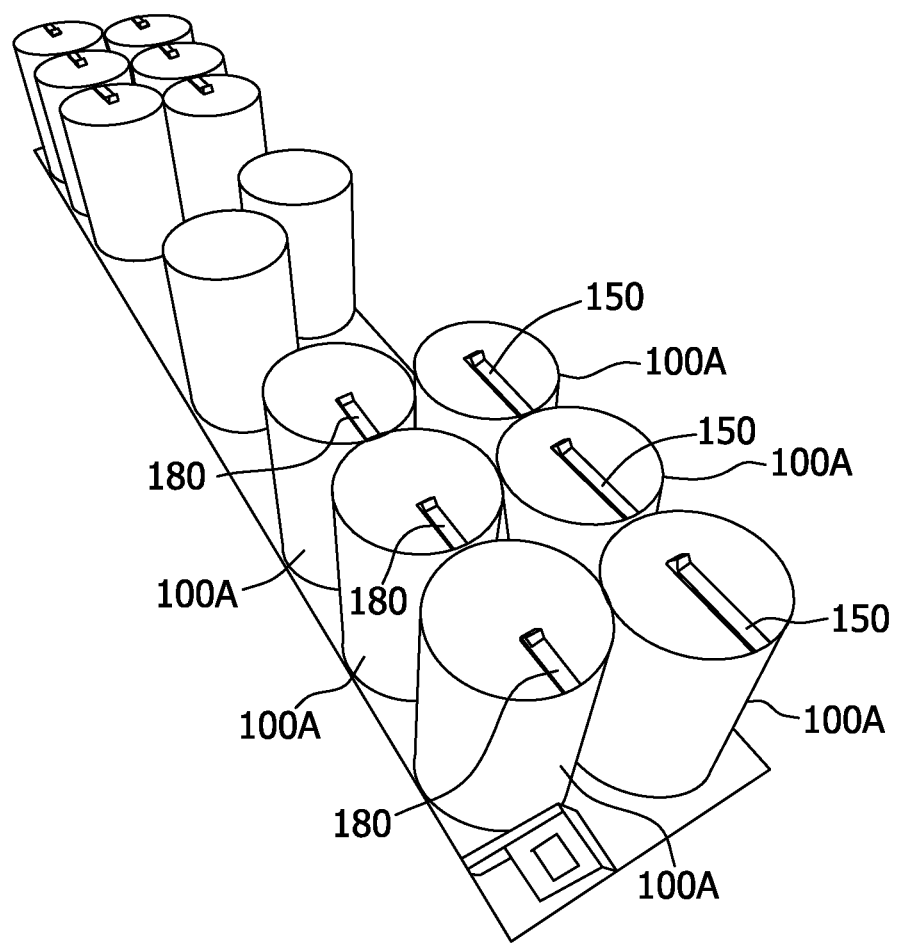
FIG. 20 is a top perspective view of a cylinder arrangement with the transverse cylinders removed and illustrating the shipping chocks in place.

FIG. 19 illustrates another embodiment similar to FIG. 18 but having a different number of cylinders. FIG. 20 illustrates a cylinder arrangement with the transverse cylinders removed so that the placement and alignment of the shipping chocks 180 and 150 can be clearly observed.

As noted above, the number of cylinders that may be loaded in a container such as a railcar, whether a 50 foot or 60 foot railcar or another container, is dependent on the size of the cylinders. For example, FIG. 20 illustrates an arrangement of cylinders 100A and 100B that are, for example, 50 inch diameter cylinders. As seen in FIG. 20, thirty-two cylinders are situated in the container 100 between the end walls 190 and 196 and the side walls 192 and 194.

Regardless of how many containers are loaded in the container 110, shipping appreciably more cylinders in the container 110 results in substantially reduced costs to ship the paper roll cylinders.

Figure 17:
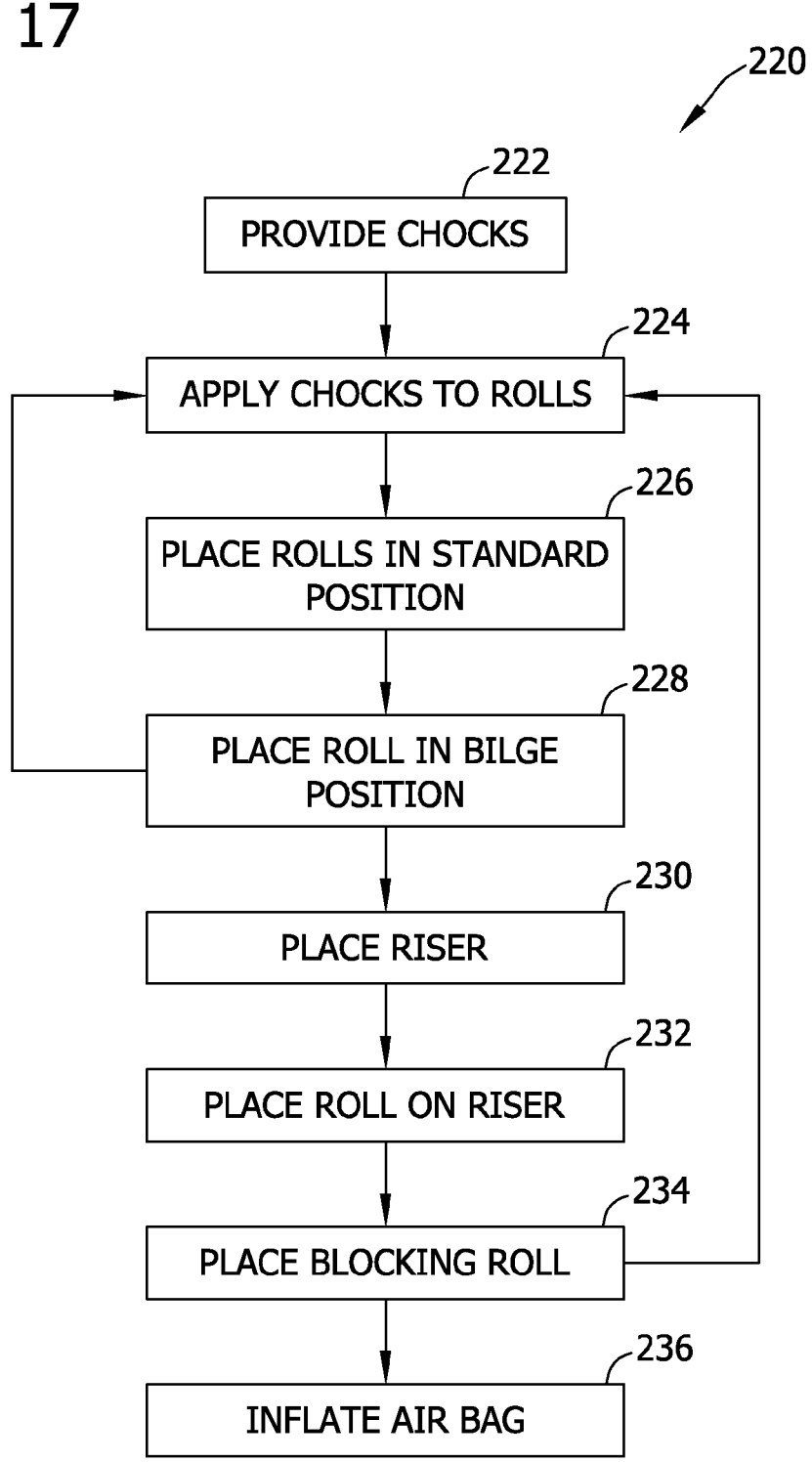
FIG. 17 illustrates a method for loading the cylinders to achieve the orientations shown in FIGS. 10-16.

FIG. 17 illustrates a flowchart of a method 220 for loading the cylinders to achieve the orientations shown in FIGS. 10-16. The method 220 includes providing 222 the shipping chocks at a loading site where the cylinders are located, and positioning or applying 224 the chocks on the top ends of at least two vertically oriented cylinders (FIGS. 8 and 9). In one embodiment, a clamp truck may be used to move the cylinders adjacent a platform, so that a worker standing on the platform may apply the chocks on the top end of the cylinders.

After the chocks are applied 224, the at least two vertically oriented cylinders with the shipping chocks are then placed 226, using a clamp truck, near one end of the container (FIG. 10). Specifically, the vertically oriented cylinders are placed in what is sometimes referred to as a standard position with the shipping chocks on each cylinder generally aligned and parallel to one another. As previously described, the vertically oriented cylinders may be offset from one another in the standard position.

Once the vertically oriented cylinders are placed 226 in the container, a cylinder may be placed transversely 228 over the vertically oriented cylinders (FIGS. 11 and 12), using the clamp truck. The transverse cylinder may be lifted by a clamp truck from a generally vertical orientation, and rotated 90° to position it transversely. The transverse cylinder is then placed in what is sometimes referred to as a bilge position, by lifting the transverse cylinder over the wedges of the shipping chocks and slightly forward of the wedges, and gently lowering the transverse cylinder and releasing the cylinders from about the height of the wedge and allowing the transverse cylinder to roll and nest on the wedges of the chocks. In doing so, the transverse cylinder is captured between the wedges and the end wall of the container.

A series of vertically oriented cylinders and transverse cylinders may be similarly placed in the container using the shipping chocks, with the next vertically oriented cylinders located adjacent the previously placed vertically oriented cylinders, and the shipping chocks of each successive transverse cylinders being captured between the wedges of the shipping chocks and preceding transverse cylinder (FIGS. 13-15).

Once a desired sequence of vertically oriented and transverse cylinders are placed, a cylinder riser may be placed 230 at the end of the sequence (FIGS. 14 and 15). A cylinder may be placed 232 on the riser in an elevated position that abuts the last transverse cylinder. A blocking cylinder may be placed 234 adjacent the elevated cylinder (FIGS. 14 and 15) to prevent the elevated cylinder from moving. A relatively compact, safe and secure arrangement of cylinders is therefore provided at one end of the container.

If desired, the method steps 224-234 may be repeated at the opposing end of the container, and a void filler such as an air bag may be placed and utilized 236 to fill the space between the groups of cylinders at the ends of the container. The container is therefore ready for transport.

The steps of unloading the container involve essentially reversing the steps of the loading method 220 and removing the cylinders in reverse order in which they were loaded, while removing the shipping chocks as the vertically oriented cylinders are unloaded. The chocks may be reused on other cylinders to perform the method 220 again.

Combinations of horizontally stacked cylinders and vertically oriented cylinders with transverse cylinders as described above may also be utilized in a container. For example, cylinders having a length of less than 74 inches could be horizontally stacked while cylinders having a length of more than 74 inches could be oriented vertically, with transverse cylinders chocked on their top ends as described above. It should be noted, however, that varying diameters of rolls that are loaded vertically and transversely may lead to undesirable roll shifting While the invention has been described in terms of various specific embodiments, those skilled in the art will recognize that the invention can be practiced with modification within the spirit and scope of the claims.

What is claimed is:

1. A method for loading a shipping container with a plurality of cylindrical-shaped objects, said method comprising:
providing at least a first shipping chock and a second shipping chock, the first shipping chock and the second shipping chock each including a runner and a wedge, the runner being generally elongated and having a first end, a second end, a length and a width, the wedge being positioned proximate the first end of the runner, the wedge extending upwardly from the runner, the wedge having a width and a length that is substantially less than the length of the runner;

positioning the first shipping chock on a top end of a first cylindrical-shaped object and the second shipping chock on a top end of a second cylindrical-shaped object, the first and second cylindrical-shaped objects being vertically oriented;

positioning the first and second cylindrical-shaped objects with the first and second shipping chocks thereon proximate a first end of the shipping container, the first shipping chock on the first cylindrical-shaped object being substantially parallel to the second shipping chock on the second cylindrical-shaped object; and positioning a third cylindrical-shaped object transversely over the vertically oriented first and second cylindrical-shaped objects in contact with the runners of the first shipping chock and the second shipping chock proximate the wedges, the third cylindrical-shaped object being retained between the wedges and a first end wall of the shipping container, wherein the wedge of each of the first shipping chock and the second shipping chock is configured to engage a cylindrical outer wall of the third cylindrical-shaped object and provide a stop surface to retain the transverse third cylindrical-shaped object on the vertically oriented first and second cylindrical-shaped objects during transit.

2. A method in accordance with claim 1 wherein said positioning the first shipping chock on a top end of a first cylindrical-shaped object and the second shipping chock on a top end of a second cylindrical-shaped object further comprises aligning the second end of each shipping chock runner with an outer wall of each of the first and second cylindrical-shaped objects, the outer wall extending between the top end and a bottom end of each of the first and second cylindrical-shaped objects.

3. A method in accordance with claim 1 wherein said positioning the first and second cylindrical-shaped objects with the first and second shipping chocks thereon near a first end of the shipping container further comprises:
  positioning the first cylindrical-shaped object adjacent a first side wall of the shipping container; and
  positioning the second cylindrical-shaped object adjacent a second side wall of the shipping container.

4. A method in accordance with claim 1 wherein said positioning a third cylindrical-shaped object transversely over the vertically oriented first and second cylindrical-shaped objects further comprises:
  lifting the third cylindrical-shaped object over the wedges of the first and second shipping chocks; and
  lowering the third cylindrical-shaped object slightly forward of the wedges and rolling the third cylindrical-shaped object into place on the first and second cylindrical-shaped objects.

5. A method in accordance with claim 1 wherein said positioning a third cylindrical-shaped object transversely over the vertically oriented first and second cylindrical-shaped objects further comprises releasing the third cylindrical-shaped object from about a height of the wedges and allowing the third cylindrical-shaped object to roll into place on the first and second cylindrical-shaped objects.

6. A method in accordance with claim 1, wherein said positioning the first and second cylindrical-shaped objects with the first and second shipping chocks thereon proximate a first end of the shipping container further comprises:
  positioning the first cylindrical-shaped object adjacent the first end wall of the container; and
  positioning the second cylindrical-shaped object a distance from the first end wall of the container, wherein the first shipping chock has a first runner length and the second shipping chock has a second runner length, the first and second runner lengths selected to locate each of the wedges at the same distance from the first end wall of the shipping container despite the first and second cylindrical-shaped objects being located at different distances from the first end wall of the shipping container.

7. A method in accordance with claim 6 wherein said positioning the second shipping chock on the second cylindrical-shaped object further comprises positioning the second shipping chock on the second cylindrical-shaped object, wherein the second shipping chock has a second runner length shorter than the first runner length.

8. A method in accordance with claim 1 further comprising positioning a first series of vertically oriented cylindrical-shaped objects and a first series of transverse cylindrical-shaped objects in the shipping container proximate the first end of the shipping container using at least a third shipping chock, wherein at least one next vertically oriented cylindrical-shaped object is located adjacent the first and second cylindrical-shaped objects, the third shipping chock positioned on the at least one next vertically oriented cylindrical-shaped object retaining a next transverse cylindrical-shaped object between a wedge of the third shipping chock and the transverse third cylindrical-shaped object.

9. A method in accordance with claim 8 wherein said positioning a first series of vertically oriented cylindrical-shaped objects and a first series of transverse cylindrical-shaped objects in the shipping container further comprises positioning a cylinder riser at an end of the first series of vertically oriented cylindrical-shaped objects, the end of the first series of vertically oriented cylindrical-shaped objects being proximate a center of the shipping container.

10. A method in accordance with claim 8 wherein said positioning a first series of vertically oriented cylindrical-shaped objects and a first series of transverse cylindrical-shaped objects in the shipping container further comprises positioning a blocking cylindrical-shaped object on a cylinder riser, the blocking cylindrical-shaped object in an elevated position with respect to the first series of vertically oriented cylindrical-shaped objects and abutting an end transverse cylindrical-shaped object at an end of the first series of transverse cylindrical-shaped objects, the cylinder riser and the blocking cylindrical-shaped object facilitating retaining the first series of transverse cylindrical-shaped objects in position with respect to the first series of vertically oriented cylindrical-shaped objects.

11. A method in accordance with claim 8 wherein said positioning a first series of vertically oriented cylindrical-shaped objects and a first series of transverse cylindrical-shaped objects in the shipping container further comprises positioning a bracing cylindrical-shaped object adjacent a blocking cylindrical-shaped object to prevent the blocking cylindrical-shaped object from moving with respect to at least the first series of vertically oriented cylindrical-shaped objects, wherein the blocking and bracing cylindrical-shaped objects facilitate preventing the transverse and vertical cylindrical-shaped objects from moving during transport.

12. A method in accordance with claim 8 further comprising positioning a second series of vertically oriented cylindrical-shaped objects and a second series of transverse cylindrical-shaped objects in the shipping container proximate a second end of the shipping container using at least a fourth shipping chock, the second series of vertically oriented cylindrical-shaped objects and the second series of transverse cylindrical-shaped objects substantially mirroring an arrangement of the first series of vertically oriented cylindrical-shaped objects and the first series of transverse cylindrical-shaped objects, wherein the first series of vertically oriented cylindrical-shaped objects and the first series of transverse cylindrical-shaped objects form a first group of cylindrical-shaped objects and the second series of vertically oriented cylindrical-shaped objects and the second series of transverse cylindrical-shaped objects form a second group of cylindrical-shaped objects.

13. A method in accordance with claim 12 wherein said positioning a second series of vertically oriented cylindrical-shaped objects and a second series of transverse cylindrical-shaped objects in the shipping container further comprises positioning a void filler between the first group of cylindrical-shaped objects at the first end of the shipping container and the second group of cylindrical-shaped objects at the second end of the shipping container.

14. A shipping chock for securing a first cylindrical-shaped object in a transverse position to a second cylindrical-shaped object and a third cylindrical-shaped object, the first cylindrical-shaped object secured in position using at least two of said shipping chocks positioned respectively on the second and third cylindrical-shaped objects, the second and third cylindrical-shaped objects being vertically oriented, said shipping chock comprising:

a generally elongated runner having a length and a width; and a wedge extending upwardly from said runner, said wedge having a width that is less than the width of said runner and a length that is substantially less than the length of said runner, said wedge substantially centered across the width of said runner, wherein said wedge is configured to engage a cylindrical outer wall of the first cylindrical-shaped object and provide a stop surface to retain the transverse first cylindrical-shaped object on the vertically oriented second and third cylindrical-shaped objects during transit, said wedge comprising a vertical face that extends upwardly substantially perpendicular to said runner immediately adjacent a first end edge of said runner and a ramp surface extending between a top of the vertical face to a top surface of said runner toward a free second end edge of said runner.

15. A shipping chock in accordance with claim 14 wherein said wedge is configured to prevent the transverse first cylindrical-shaped object from rolling off the second and third cylindrical-shaped objects while at least the first cylindrical-shaped object is being unloaded.

16. A shipping chock in accordance with claim 14 wherein said runner is generally planar, and said wedge comprises a generally triangular cross-sectional shape.

17. A shipping chock in accordance with claim 14 wherein said wedge comprises at least one passage extending therethrough along the width of said wedge to facilitate providing ventilation through said wedge.

18. A shipping chock in accordance with claim 14 wherein said wedge is configured to retain a transverse cylindrical-shaped object having a diameter between about 50 inches and about 58 inches.

* * * * *